US008467569B2

(12) United States Patent
Berger et al.

(10) Patent No.: US 8,467,569 B2
(45) Date of Patent: Jun. 18, 2013

(54) METHOD AND APPARATUS FOR TRANSPORTING AN ARTICLE TO BE PRINTED

(75) Inventors: Gisbert Berger, Berlin (DE); Jürgen Hohlwegler, Allensbach (DE); Jörg-Andreas Illmaier, Kreuzlingen (CH); Rudolf Rapp, Constance (DE); Matthias Schulte-Austum, Radolfzell (DE)

(73) Assignee: Siemens Aktiengesellschaft, Munich (DE)

( * ) Notice: Subject to any disclaimer, the term of this patent is extended or adjusted under 35 U.S.C. 154(b) by 267 days.

(21) Appl. No.: 13/074,381

(22) Filed: Mar. 29, 2011

(65) Prior Publication Data

US 2011/0235854 A1 Sep. 29, 2011

(30) Foreign Application Priority Data

Mar. 29, 2010 (DE) ........................ 10 2010 013 220

(51) Int. Cl.
*G06K 9/00* (2006.01)
*G06F 7/00* (2006.01)

(52) U.S. Cl.
USPC ............................ 382/101; 382/321; 700/226

(58) Field of Classification Search
USPC ................. 382/100–103, 106–107, 112–116, 382/123, 135–140, 155, 162, 168, 170, 173, 382/181–189, 193, 199, 209, 232, 254, 274, 382/276, 287–294, 305, 312, 321; 700/228, 700/226; 326/41
See application file for complete search history.

(56) References Cited

U.S. PATENT DOCUMENTS 6,525,563 B2 * 2/2003 Hamano et al. ................. 326/41
7,720,256 B2 * 5/2010 Desprez et al. ............... 382/101

(Continued)

FOREIGN PATENT DOCUMENTS

DE 699 31 338 T2 2/2007
DE 102006059525 B3 1/2008
DE 10 2008 017 190 A1 3/2009
DE 10 2008 017 191 A1 3/2009

(Continued)

OTHER PUBLICATIONS

German Patent and Trademark Office Search Report, Dated Nov. 9, 2010.

*Primary Examiner* — Seyed Azarian
(74) *Attorney, Agent, or Firm* — Laurence A. Greenberg; Werner H. Stemer; Ralph E. Locher

(57) ABSTRACT

A method and an apparatus transport an article of mail. During a first decision-making process, an image of the article is generated and evaluated to generate a first vector. Further, a transport attribute is measured and stored together with the first vector. The transport of the article is continued on the basis of the measured transport attribute value. During a further decision-making process, an image of the article is generated and evaluated to generate a second vector. The transport attribute value is determined with the aid of the second vector. The transport of the article is continued on the basis of the stored and determined transport attribute value. The article is provided with an optically detectable element. The first vector is generated such that it contains that value assumed by the feature for the article if the surface of the article had already been provided with the optically detectable element.

11 Claims, 7 Drawing Sheets

U.S. PATENT DOCUMENTS

| | | | | |
|---|---|---|---|---|
| 2009/0074543 | A1 | 3/2009 | Berger et al. | |
| 2009/0074557 | A1 | 3/2009 | Berger et al. | |
| 2009/0074558 | A1 | 3/2009 | Berger et al. | |
| 2009/0076649 | A1* | 3/2009 | Berger et al. | 700/228 |
| 2010/0023490 | A1 | 1/2010 | Wilke | |
| 2010/0111356 | A1* | 5/2010 | Berger et al. | 382/101 |
| 2010/0232642 | A1* | 9/2010 | Desprez | 382/101 |

FOREIGN PATENT DOCUMENTS

| | | | |
|---|---|---|---|
| DE | 102008017185 | A1 | 3/2009 |
| DE | 102008017189 | A1 | 3/2009 |
| DE | 10 2006 051 777 | B4 | 4/2009 |
| DE | 10 2008 026 088 | A1 | 12/2009 |
| FR | 2841673 | A1 | 1/2004 |
| WO | 2008/152277 | A2 | 12/2008 |

* cited by examiner

FIG 5A
FIG 5
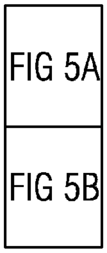
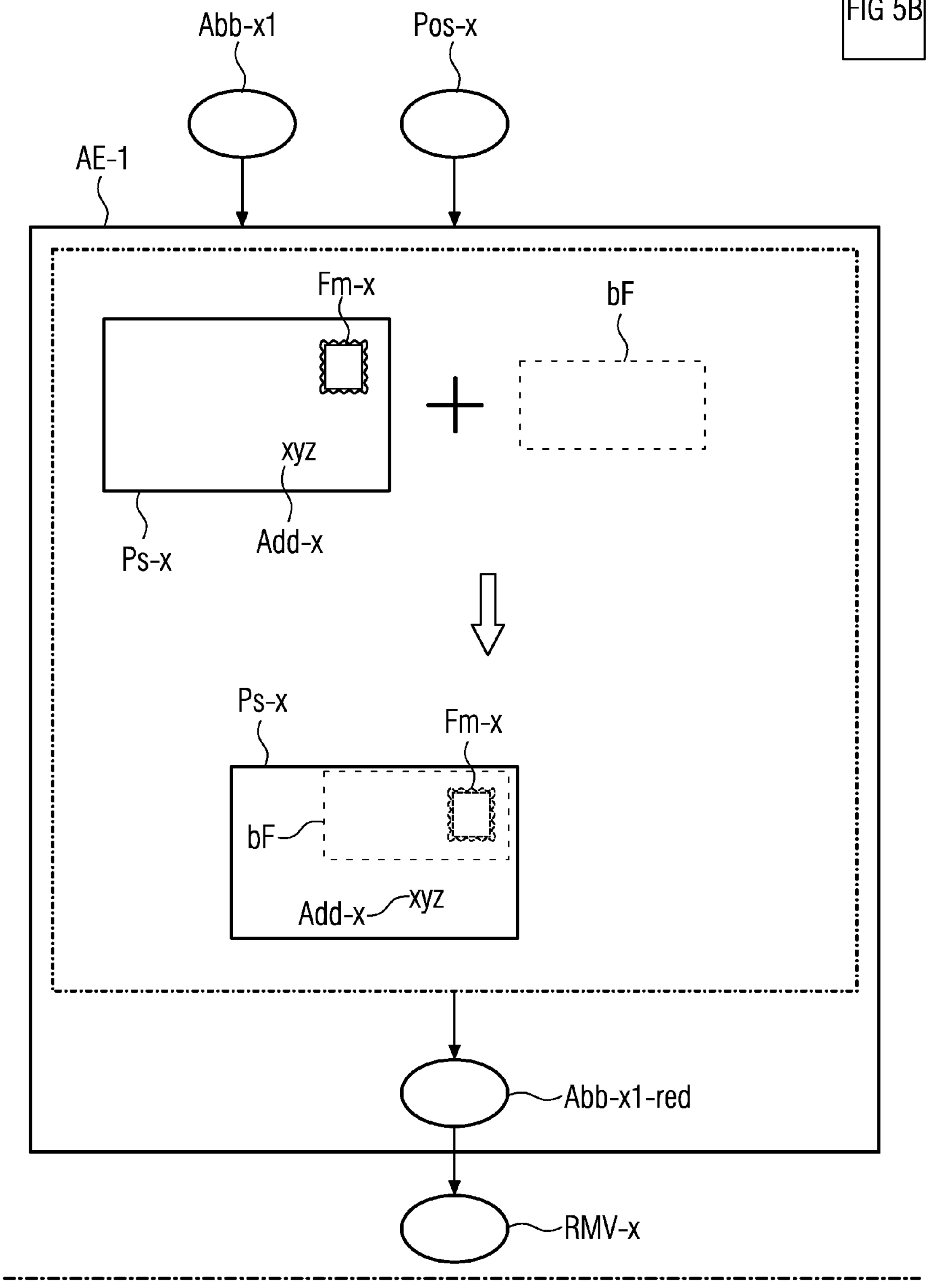

METHOD AND APPARATUS FOR TRANSPORTING AN ARTICLE TO BE PRINTED

CROSS-REFERENCE TO RELATED APPLICATION

This application claims the priority, under 35 U.S.C. §119, of German application DE 10 2010 013 220.9, filed Mar. 29, 2010; the prior application is herewith incorporated by reference in its entirety.

BACKGROUND OF THE INVENTION

Field of the Invention

The invention relates to a method and an apparatus for transporting an article to be printed, in particular an item of mail.

German patent DE 10 2006 051 777 B4, corresponding to U.S. patent publication No. 20100111356, describes a method and an apparatus for identifying an item of mail while this item of mail is being transported to a predefined destination address. Characteristic image features of the item of mail ("feature value vector", "signature") are determined and stored in a first run ("registration run"). In addition, at least one item of information relating to the item of mail is determined and is stored, together with the feature value vector, in a data record. The information is, for example, the deciphered destination address, the weight, the rigidity and dimensions of the items of mail as well as information relating to a franking mark on the item of mail. In addition, an identification code is applied to the item of mail and is stored in the data record. There are so few possible variations of this identification code that the identification code alone cannot distinguish the item of mail from all other items of mail. For example, there are 16 or 25 different possible identification codes.

The surface of the item of mail may be changed during onward transport. For example, an additional cancellation imprint or advertising imprint is applied to the item of mail or else an indication of a forwarding address. For onward transport of the item of mail, the stored information, in particular the destination address or a physical attribute of the item of mail, is required again. This information is required, in particular, in a subsequent identification run. In this identification run, a feature value vector ("signature") for the item of mail is generated again. The stored data record for the item of mail is searched for and determined. For this search, on the one hand, the feature value vector generated in the identification run is compared with stored feature value vectors. On the other hand, the identification code on the item of mail is read and is compared with stored identification codes. The data record with matching identification codes and the most similar feature value vector is determined.

Published, non-prosecuted German patent application DE 10 2008 026 088 A1 corresponding to U.S. patent publication No. 200900045105, describes a method and an apparatus for transporting bulk mailings. A desired image is transmitted in computer-accessible form to a sorting system. This desired image shows the surface of such a bulk mailing and applies to every bulk mailing in a particular set of bulk mailings. However, the bulk mailings need to be transported to different delivery addresses, and each bulk mailing is provided with the respective delivery address in advance or during transport. Therefore, an actual image of a particular bulk mailing does not match the desired image which has been transmitted. Nevertheless, while an item of mail is being transported, an actual image of the item of mail is generated and is compared with the transmitted desired image in order to decide whether this item of mail is a bulk mailing from the set of bulk mailings, which corresponds to the desired image, or another item of mail. For this purpose, an image evaluation unit calculates the address block from the actual image and compares the actual image computationally changed in this manner with the desired image which has been transmitted.

International patent disclosure WO 2008/152277 A2, corresponding to U.S. patent publication No. 2010/0232642 A1, likewise describe a method and an apparatus, in which an item of mail runs through a sorting system twice. In the first run, a feature value vector ("signature numérique"-"digital signature") for the item of mail is generated, for which purpose a computer-accessible image of the item of mail is generated and evaluated. This feature value vector is stored as part of a data record in a central data memory. In a subsequent, second sorting run, a feature value vector for the item of mail is generated again and this feature value vector is used to search for the stored data record. The problem of identical bulk mailings being able to be distinguished from one another only on the basis of different address blocks occurs in this case. A distinction is therefore made between global features and local features. When searching for the stored feature value data record, global feature values are first of all compared, in order to quickly exclude very dissimilar stored feature value vectors, and then only local feature values. In addition, the stored feature value vectors are automatically subdivided into classes. During the subsequent sorting run, the class to which the feature value vector to be examined belongs is first of all determined and the most similar feature value vector is then searched for within these classes. This makes it possible to eliminate the influence of different light conditions during the first and second sorting runs which could otherwise lead to incorrect results.

Published, non-prosecuted German patent applications DE 102008017191 A1, corresponding to U.S. patent publication No. 20090074558, and DE 102008017190 A1, corresponding to U.S. patent publication No. 20090076649, describe methods for restricting the search space when searching for the stored feature value vector and thus having to carry out fewer comparisons of the current feature value vector with stored feature value vectors.

European patent EP 1131793 B1, corresponding to U.S. Pat. No. 6,851,619, and German Utility Model DE 69931388 T2 describe a method and an apparatus for producing franking marks for items of mail and then checking said marks.

SUMMARY OF THE INVENTION

It is accordingly an object of the invention to provide a method and an apparatus for transporting an article to be printed which overcomes the above-mentioned disadvantages of the prior art devices of this general type, which method and apparatus make it possible to physically change the article in a visible manner between the two decision-making processes and nevertheless make it possible to find the data record for this article during the further decision-making process without having to provide the article with a decipherable identification code in this case.

In the method according to the solution and in the apparatus according to the solution, at least one article is transported to a predefined destination. It is possible for a plurality of articles to be transported to a respective predefined destination.

At least one optically detectable feature, preferably a plurality of features, and at least one transport attribute are predefined.

The transporting operation respectively contains a first decision-making process and at least one further decision-making process for each article to be transported. It is possible for a plurality of further decision-making processes to be carried out in succession after the first decision-making process.

The first decision-making process contains the following steps which are carried out automatically: at least one first computer-accessible image of the article is generated. This image shows at least one surface of the article. For each predefined feature, a measurement is carried out for the first time in order to determine the value assumed by this feature for the article, for which purpose the at least one first computer-accessible image of the surface of the article is evaluated. If there are n predefined features, a vector with n feature values is thus generated.

For each transport attribute, a measurement is carried out in order to determine the value assumed by this transport attribute for the article. A data record for the article is generated and is stored in a central data memory. The data record contains a vector with the n measured feature values and with the at least one measured transport attribute value. The first decision-making process is carried out on the basis of at least one measured transport attribute value. The transport of the article is continued on the basis of the first decision-making process.

The at least one further decision-making process contains the now described steps which are carried out automatically. A further computer-accessible image of the article is generated. For each predefined feature, a measurement is again carried out in order to determine the value assumed by this feature for the article, for which purpose the further computer-accessible image is evaluated. This again generates a vector with n feature values. The data record which was generated for this article and was stored in the central data memory is determined. For this determination, the feature value vector measured during the renewed measurement is used to search for the data record for this article in the central data memory and, in the process, to compare the measured feature value vector with stored feature value vectors. The at least one transport attribute value included in the data record determined is determined. The further decision-making process is carried out on the basis of at least one transport attribute value determined. The article is transported further on the basis of the result of the further decision-making process.

After the first measurement (for the first decision-making process) and before the first renewed measurement (for the further decision-making process), the surface of the article is provided with an optically detectable element. This step affects the value of at least one measured feature in the sense that the optically detectable element can be seen in the further image but not in the first image, and the image of the article with the optically detectable element therefore results in a different value of this feature than an image of the article without the optically detectable element.

The now described predefined objects are used for the step of providing the surface of the article with the optically detectable element. A predefined computer-accessible determination of the position of the element on the surface of the article, that is to say where the element should be placed on the surface of the article, and a predefined computer-accessible pattern of the element.

The position determination and the pattern together act as a printing original for the operation of providing the article with the optically detectable element. The element is directly applied or sprayed or etched onto the article, for example. Alternatively, the optically detectable element is printed onto a previously empty label and the label is glued to the article at the predefined position. The predefined pattern is used to print the label.

The feature value vector stored in the data record—that is to say the feature value vector generated during the first decision-making process—for this article is generated in such a manner that the stored feature value vector satisfies the now described property. The feature value vector contains, for each feature, that value which would have been assumed by the feature for the article if the surface of the article had already been provided with the optically detectable element during the first measurement. The position determination and the element pattern are used for the step of generating this feature value vector. The at least one further image which is evaluated for the renewed measurement is generated from the article which has been provided with the optically detectable element.

This computationally changed feature value may be the same as the feature value actually measured, namely when the application of the optically detectable element does not change the value of this feature, that is to say does not influence the feature. The computationally changed feature value may also be a value which differs from the feature value actually measured because the application of the element influences the feature.

According to the solution, the article to be transported is measured in the first decision-making process without the optically detectable element. Only then is the optically detectable element applied. This order is predefined, for example, by the arrangement of measuring devices and a printer and/or by the processing process when transporting the article. The effect of this element on the optically detectable features is computationally supplemented in the feature value vectors to be stored. The article is measured with the optically detectable element in the further decision-making process or in each further decision-making process. The feature value vector obtained during the renewed measurement is compared with the computationally changed feature value vector from the first measurement.

Measuring the transport attribute requires effort and/or time, in particular if the measurement requires the cooperation of a person. It is therefore expedient to measure the value of this transport attribute only once for each article. However, the at least one transport attribute value is repeatedly required during transport in order to decide between different alternatives for continuing transport. The destination address to which the article is to be transported is an example of such a transport attribute value which is repeatedly required in order to decide how transport of the article is continued. The weight, a dimension or a surface property of the article are further examples of transport attributes.

In order to have to measure the transport attribute only once, the measured value must be stored and must be determined whenever the value is required again. This requires the stored transport attribute value to be found again among a plurality of stored transport attribute values. For this purpose, the article is identified again during each decision-making process.

The solution according to the invention dispenses with the need to have to provide the article with an identifier ("ID tag") in order to be able to identify the latter and determine the transport attribute value. Rather, a feature value, preferably a vector with a plurality of feature values, is used to identify the article. At least one feature is measured by detecting and evaluating an image of the article.

The solution according to the invention dispenses with the need to have to apply an identifier to the article during transport and subsequently decipher it again. In particular, neither a code for the transport attribute value, for example a sorting code, nor an identifying identifier ("ID code") nor an identifier as described in German patent DE 10 2006 051 777 B4 needs to be printed on or applied in another manner. This saves time and material for the printing operation and eliminates the risk of a transport error being caused by incorrectly deciphering an identifier. The optically detectable element does not need to be able to be deciphered by machine and may also be a pictogram, a logo or a character string.

The invention solves the problem which results from the fact that the article is provided with an optically detectable element between the first measurement and the second measurement. Application of this optically detectable element results in the feature or a feature having a different value after application than before application. Despite this change, the article is intended to be identified using the feature value vector. The invention shows a way of doing this.

The feature values measured during the first measurement are computationally changed in such a manner that those values which would be assumed by the respective feature if the optically detectable element were already present on the article before the first measurement are obtained. The optically detectable element can therefore be used to distinguish this article from other transported articles and to find the correct data record in the central data memory. This effect also occurs when the optically detectable element cannot be or is not deciphered by machine. This effect, in particular, distinguishes the invention from a procedure in which the optically detectable element is simply "masked".

The at least one optically detectable feature is selected, for example, from the following list:

a dimension of the article;

the distribution of gray-scale values on the surface of the article;

the distribution of color values on the surface of the article;

the number of text blocks on the surface of the article and the respective position and/or dimension of each text block;

the position and/or size of at least one text block;

the number of graphical elements on the surface of the article, for example transport notes, logos or franking marks; and the position and graphical properties of at least one graphical element.

The following attributes, for example, are used as the transport attribute:

the destination to which the article is to be transported, the article being provided with an article identification to be deciphered or this destination being predefined to at least one computer-accessible list of recipients;

the weight of the article;

a dimension of the article;

a surface property of the article;

sender's instructions for delivering the article; or the value of a franking mark or another indication of a delivery fee, the article being provided with this franking mark or other indication.

The optically detectable element is, for example, a franking mark which is applied to the article after the first measurement and before the further measurement, cancellation of a franking mark with which the article is provided, an advertising imprint which is applied after the first measurement, a transport note, an indication of a destination address to which the article is to be transported, this indication being applied after the first measurement, or a note on the result of a security check or other content check, the article being subjected to this safety check after it has been measured for the first time.

In one refinement, the optically detectable element is "calculated into" the computer-accessible image of the article, and the feature values are generated by evaluating this supplemented image.

In another refinement, the effect of the optically detectable element is "calculated into" the feature values.

In one refinement, each article is already provided with details of a destination before the first decision-making process. The article is to be transported to this destination. The destination details act as a transport attribute. Those properties of the article which can be measured with such a large amount of effort that the article is identified and the data record is determined more quickly than the renewed measurement of the transport attribute are preferably used as transport attributes.

In another refinement, the article is provided with details of the destination after the first decision-making process and before the further decision-making process. These destination details act as the optically detectable element. A list containing destination details is predefined. Weight, dimensions and/or logos and other graphical and/or textual elements on the surface of the article act as the transport attribute, for example.

This refinement can be used, in particular, to transport a set of identical articles to different destinations, for example a large number of copies of an issue of a magazine to different addressees. A sender delivers the copies without delivery addresses as well as a computer-accessible list containing the delivery addresses of the recipients of these bulk mailings. A transport service provider provides the articles with the delivery addresses during transport and after the first measurement so that a delivery agent can correctly deliver the articles.

Both the first image and each further image of the article are preferably generated while the article is being illuminated with light in the visible range. The same defined and reproducible ambient condition is preferably established each time the article is illuminated, for example a darkened room and illumination with white light.

The invention can be used, for example, to transport items of mail, items of luggage belonging to travelers, containers or other cargo items or else for workpieces in a production system.

Other features which are considered as characteristic for the invention are set forth in the appended claims.

Although the invention is illustrated and described herein as embodied in a method and an apparatus for transporting an article to be printed, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIGS. 5A and 5B are illustrations showing the use of an elimination region ("blind spot").

DETAILED DESCRIPTION OF THE INVENTION

In the exemplary embodiment, the method according to the solution and the apparatus according to the solution are used to control the transport of items of mail (letters, large letters, postcards, catalogs, packages, etc.). Each item of mail is provided with a respective indication of that destination to which this item of mail is to be transported. This destination is a postal address or another stipulation of a location on the earth's surface, for example geo-coordinates.

It is possible for the item of mail to be provided with a destination indication only during transport. For example, a printing company delivers a large number of identical copies of a bulk mailing without details of the destination and also transmits a computer-accessible list containing the destinations to which these bulk mailings are to be delivered.

In the exemplary embodiment, each item of mail is transported using suitable transportation means, for example using containers, in suitable vehicles by rail, road and/or through the air. During this transport, each item of mail first of all runs through an aligning device and then through a sorting system at least twice. The aligning device aligns each item of mail and orients it. After alignment and orientation, the text field containing the destination address of each item of mail points to the same side and such that the characters are upright, that is to say not upside down. The franking mark also points to this side. Each item of mail is oriented in such a manner that the franking mark—as seen in the direction of transport—is arranged close to the front edge. The print head mentioned later is also on this side.

The sorting system for the first run is responsible for that location to which the item of mail was delivered. The sorting system for the second run is responsible for the destination of the item of mail. This destination is certainly first determined during the first run by the first sorting system deciphering the destination details on the item of mail or evaluating the computer-accessible list. If the same sorting system is responsible for the delivery location and for the destination, the item of mail runs through the same sorting system twice, but the sorting system is configured differently in the second run than in the first run.

Figure 1:
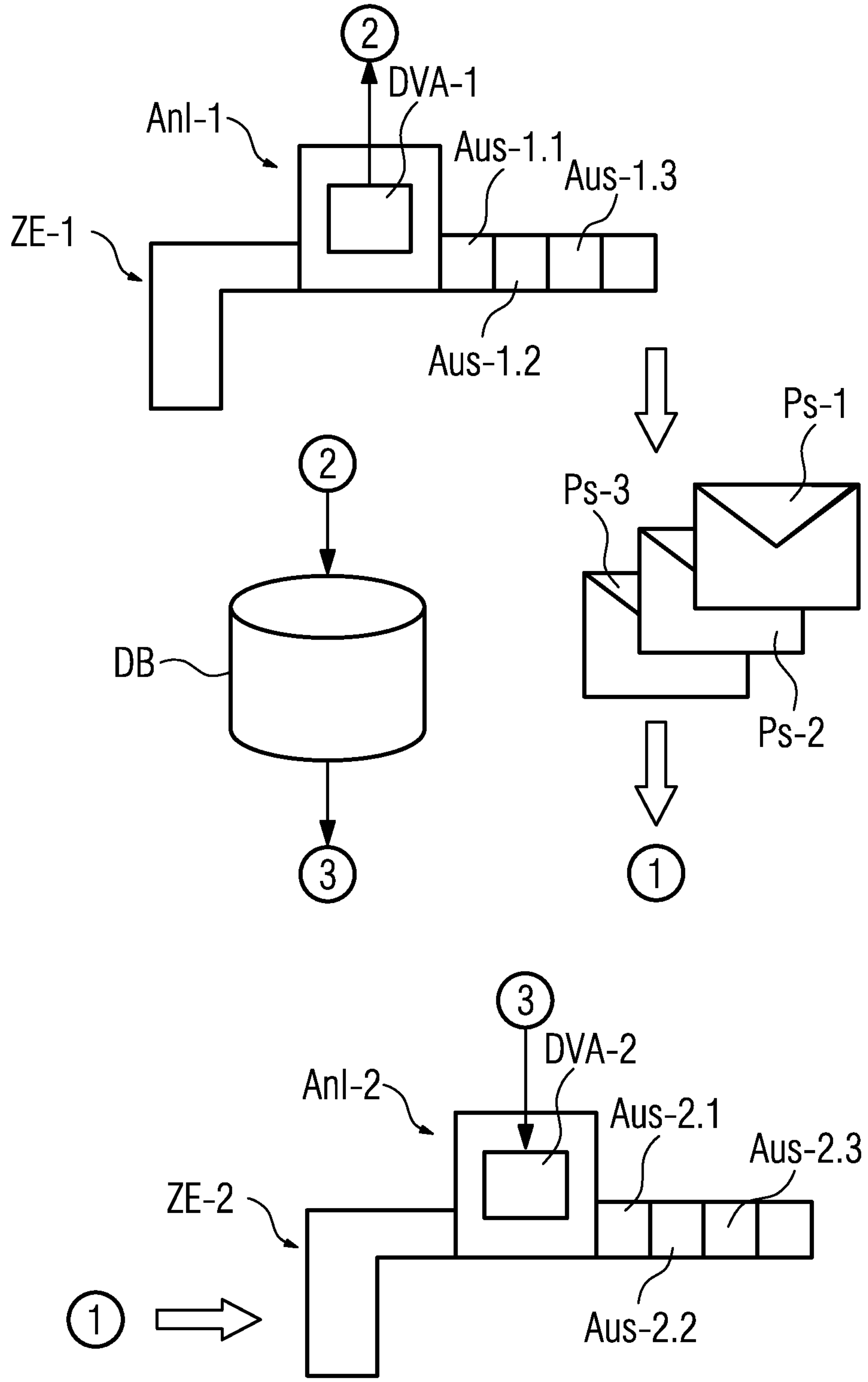
FIG. 1 is an illustration showing an arrangement having two sorting systems and a central database according to the invention.

FIG. 1 illustrates this arrangement. The three items of mail Ps-1 Ps-2, Ps-3 first of all run through the first sorting system Anl-1 and then through the second sorting system Anl-2. The first sorting system Anl-1 has a feeder ZE-1 with a singulator, a data processing system DVA-1 and a plurality of sorting outlets Aus-1.1, Aus-1.2, . . . .

The second sorting system Anl-2 has a feeder ZE-2 with a singulator, a data processing system DVA-2 and a plurality of sorting outlets Aus-2.1, Aus-2.2, . . . .

Each item of mail Ps-1, Ps-2, Ps-3 is fed to the first sorting system Anl-1 using the feeder ZE-1 and runs through the first sorting system Anl-1 in the first run. The first sorting system Anl-1 discharges each item of mail into a respective sorting outlet Aus-1.1, Aus-1.2, . . . . In this case, the first sorting system Anl-1 carries out a respective first decision-making process for each item of mail in order to automatically decide the sorting outlet Aus-1.1, Aus-1.2, . . . into which this item of mail is discharged.

The items of mail from a sorting outlet are transported to the same second sorting system Anl-2 and run through this second sorting system Anl-2 in a second sorting run. Which sorting system this second sorting system is can vary from item of mail to item of mail. Each item of mail is fed to the second sorting system Anl-2 using the feeder ZE-2 and runs through this second sorting system Anl-2 in the second run. The second sorting system Anl-2 discharges each item of mail into a sorting outlet Aus-2.1, Aus-2.2, . . . . In this case, the second sorting system Anl-2 carries out a respective further decision-making process for each item of mail in order to automatically decide the sorting outlet Aus-2.1, Aus-2.2, . . . into which this item of mail is discharged in the second run.

In the first run, the now described steps are carried out for each item of mail Ps-x.

At least one computer-accessible image of a surface of the item of mail is generated. This computer-accessible image shows the destination indication with which the item of mail is provided or has been provided.

The image with the destination indication is evaluated. For this purpose, an OCR unit first of all attempts to automatically decipher the destination indication in the image of the item of mail. OCR means "optical character recognition". The OCR unit preferably has read access to an address database containing indications of valid destinations, for example indications of all postal addresses in a country. The OCR unit resolves ambiguities during deciphering as well as errors in the address by matching the deciphering result to the address database.

If the OCR unit does not manage to automatically unambiguously decipher the destination indication, the image is transmitted to a video coding station and is displayed on a visual display unit of this video coding station. An editor reads the destination indication on the visual display unit and inputs at least part of the destination indication read to an input device, for example the postcode or the "ZIP code".

A data record for the item of mail is generated and is stored in a central database or another central data memory. The first sorting system Anl-1 triggers this process. The item of mail is thus registered in the central database. Each sorting system through which the item of mail runs has read access to this central database.

In the example in FIG. 1, each data processing system DVA-1, DVA-2 of the sorting systems Anl-1, Anl-2 is connected to the central database DB as the central data memory. The data processing system DVA-1 of the first sorting system Anl-1 respectively generates a data record for each item of mail Ps-1, Ps-2, Ps-3. The data processing system DVA-2 of the second sorting system Anl-2 determines, by means of read access, the respective data record for an item of mail in transit, which data record is stored in the central database DB.

This data record contains a unique identifier ("ID") for the item of mail and a code for the deciphered destination indication. In one refinement, the data record additionally contains the computer-accessible image of the item of mail. The destination indication of an item of mail acts as a transport attribute, on the value of which onward transport of the item of mail depends and the measurement of which is time-consuming.

It is possible for the values of further transport attributes to be measured during the first run. For example, the value of the franking mark (stamp, franking emblem, matrix code or the like) on the item of mail is determined. An item of mail which has been adequately franked is intended to be transported to the predefined destination address. In contrast, an item of mail which has not been adequately franked is intended to be discharged from conventional processing and subjected to special treatment. This discharge can also be first carried out during the second run through a sorting system.

Alternatively, the item of mail is weighed and/or the dimensions of the item of mail are measured. The weight or a dimension is required, for example, in order to transfer the item of mail into a suitable transportation device and/or to transport it to a suitable further sorting system and to make a correct choice for this purpose, or the weight and the dimensions are also used to compare the delivery fee which has actually been paid with a desired delivery fee.

For example, only one of the sorting systems used has a color camera or a balance. However, the color computer-accessible image or the measured weight is intended to be available to all sorting systems.

Codes for these further measured transport attribute values are also stored as part of the data record for the item of mail in the central database.

In one refinement, a plurality of identical bulk mailings are delivered without destination details and a list containing destination indications is transmitted to the carrier. In this refinement, an image of such a bulk mailing is preferably generated and is used for all identical bulk mailings. Such a method is known from German patent DE 10 2007 038 186 B4. A data record is respectively generated for each bulk mailing, for which the list containing the destination indications is used.

Figures 2, 2A:
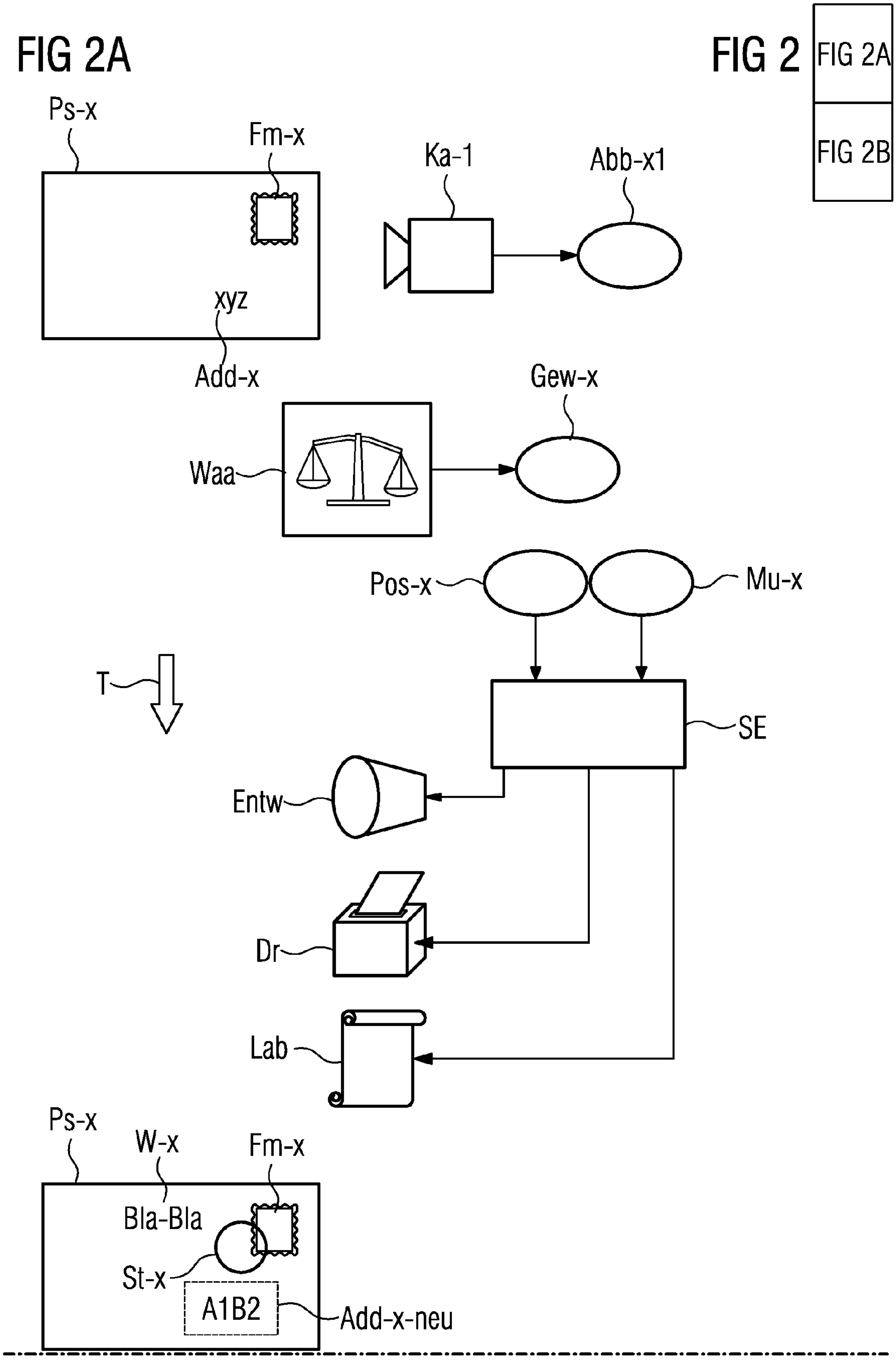
FIGS. 2A and 2B are illustrations showing the run of an item of mail through the first sorting system.
Figure 2B:
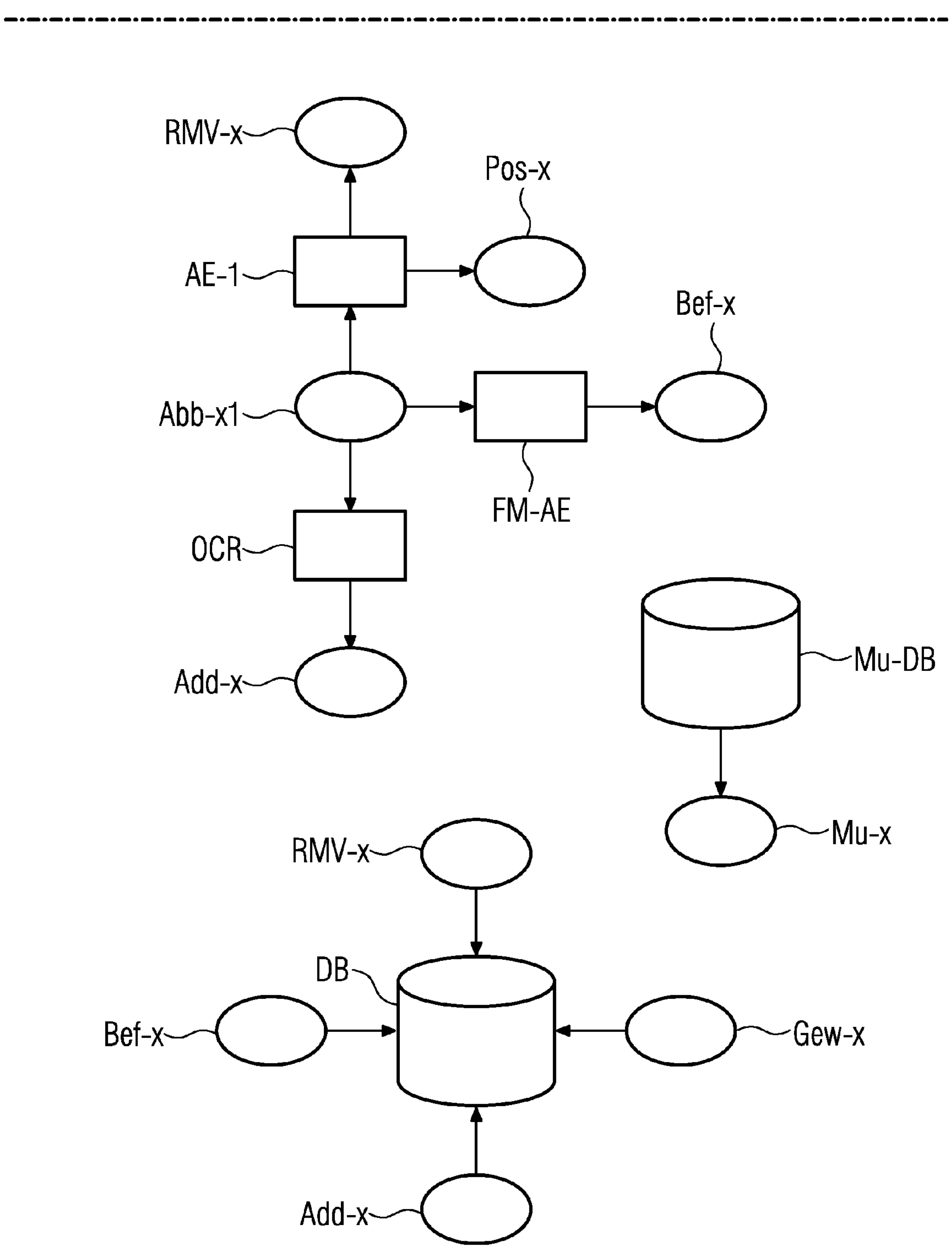

FIG. 2 illustrates the run of the items of mail Ps-x through the first sorting system Anl-1. The item of mail Ps-x is transported in a direction of transport T. The first sorting system Anl-1 contains:

an OCR unit OCR,
a camera Ka-1,
a printer Dr,
a canceler Ent,
a labeler Lab,
an evaluation unit AE-1,
a pattern database Mu-DB,
a control unit SE,
a balance Waa, and
a franking mark evaluation unit Fm-AE.

While the item of mail Ps-x runs through the first sorting system Anl-1 in the first run, the camera Ka-1 generates a computer-accessible image Abb-x1 of a surface of the item of mail Ps-x. This image Abb-x1 shows an indication of the destination address Add-x, and a franking mark Fm-x on the item of mail Ps-x.

The OCR unit OCR evaluates this image Abb-x1 in order to decipher the destination address Add-x. A code for the deciphered destination address Add-x is stored as part of the data record for the item of mail Ps-x in the central data memory DB.

The balance Waa weighs the item of mail Ps-x and thereby determines the weight Gew-x of the item of mail Ps-x. The franking mark evaluation unit Fm-AE determines the delivery fee paid for transporting the item of mail Ps-x. For this purpose, the franking mark evaluation unit Fm-AE evaluates the franking mark Fm-x shown by the image Abb-x1. If necessary, the franking mark evaluation unit Fm-AE compares this determination result with the measured weight and/or the measured dimensions of the item of mail Ps-x.

It would not be expedient to measure the transport attributes again each time an item of mail runs through a sorting system again. Therefore, the transport attribute values measured during the first run and centrally stored are reused. However, this presupposes that the item of mail is identified during each new run. Identification takes less time than the renewed reliable measurement of the transport attributes.

In the exemplary embodiment, the item of mail Ps-x is not intended to be printed with an identifier for the item of mail itself or with a code for a transport attribute value. In particular, a sorting code is not intended to be printed onto the item of mail. This saves printer fluid and labels as well as a reader for bar patterns, and a sometimes undesirable change in the item of mail is avoided. Furthermore, the step of searching for a printable area for the imprint of a bar pattern is dispensed with.

The item of mail is therefore identified during each further run using a vector containing values of optically detectable features. These feature values are measured by evaluating a computer-accessible image of the item of mail. Examples of such optically detectable features are:

the distribution of gray-scale values and/or color values on the entire surface or in a particular region of the surface of the item of mail, for example a quadrant,
the number of text blocks,
the position and/or size of the address block or address blocks (addressee, sender),
the position and/or size of the franking mark,
a deciphered part of the destination address, for example the postcode, this deciphered part being only one of a total of n features,
the number of graphical elements, for example logos or advertising imprints, the position and/or size or color of each logo or advertising imprint on the item of mail, and
the presence and possibly the position and/or size of a viewing window on the item of mail.

In one refinement, a computer-accessible grid is placed over the computer-accessible image of the surface. Each distribution of color values and each distribution of gray-scale values in a rectangle formed by this grid is a separate feature.

During the first run of an item of mail Ps-x, a measurement is carried out for the first time for each optically detectable feature in order to determine the value assumed by this feature for the item of mail. A feature value vector is obtained thereby. In the case of n predefined features to be measured, this vector generally contains n feature values. The data record for the item of mail Ps-x, which is stored in the central database DB, contains the feature value vector obtained during the first run of the item of mail Ps-x. This feature value vector is referred to as the “registration feature value vector” below.

FIG. 2 illustrates the steps carried out by the evaluation unit AE-1 when evaluating the image. The computer-accessible image Abb-x1 is transmitted, on the one hand, to the OCR unit and, on the other hand, to the evaluation unit AE-1 of the first sorting system Anl-1. The evaluation unit AE-1 evaluates the image Abb-x1 and generates the registration feature value vector RMV-x for the item of mail Ps-x.

The evaluation unit AE-1 also determines the position of the franking mark Fm-x on the item of mail Ps-x. The evaluation unit AE-1 transmits a corresponding message to the control unit SE. This message contains, in computer-accessible form, a plurality of items of position information Pos-x which describe the dimensions of the item of mail Ps-x and the position of the franking mark Fm-x on the surface of the item of mail Ps-x. The position information Pos-x also describes the position of the indication of the destination address Add-x on the surface as well as a desired position for an advertising imprint W-x, which is yet to be generated, to the left of the franking mark Fm-x.

The control unit SE controls the canceler Ent, the printer Dr and, if necessary, the labeler Lab. The canceler Ent cancels the franking mark Fm-x with a stamp imprint St-x. The printer prints an advertising imprint W-x onto the item of mail Ps-x. For this purpose, the control unit SE generates corresponding control commands and uses the position information Pos-x. For example, a desired position of each imprint with respect to the front edge and upper edge of the item of mail Ps-x is calculated, for which purpose a computer-accessible general stipulation as well as the actual position of the franking mark Fm-x are used. The desired position stipulates, for example, the respective distance between each imprint and the upper edge and front edge of the item of mail Ps-x. The pattern database Mu-DB provides a respective computer-accessible printing original for the stamp imprint St-x and the advertising imprint W-x. In one refinement, a light barrier arrangement measures the position of the front edge and the upper edge of an item of mail. The control device SE generates the control commands in such a manner that the imprint is printed on at that position relative to the front edge and to the upper edge which is predefined by the desired position.

In particular when the recipient of the item of mail Ps-x has transmitted a reforwarding order ("change of address information"), the item of mail Ps-x should be sent to a destination address Add-x-neu other than the original destination address Add-x. In this case, the printer Dr additionally prints an indication of the new address Add-x-neu onto the item of mail Ps-x. If it is not possible to print directly onto the item of mail Ps-x, the labeler Lab generates a label containing an indication of Add-x-neu and applies the printed label to the item of mail Ps-x.

In the exemplary embodiment, the following information is additionally stored in the central data memory DB as part of the data record for the item of mail Ps-x:

the registration feature value vector RMV-x, the measured weight Gew-x, the determined delivery fee Bef-x for the item of mail Ps-x, and in one refinement, the position information Pos-x.

During each further run of the item of mail Ps-x through a sorting system Anl-2, a computer-accessible image of the item of mail is again generated and evaluated. The evaluation again measures, for each optically detectable feature, the value assumed by this feature for the item of mail. This feature value vector likewise containing n feature values is used to identify the data record for the item of mail in the central data memory DB and thus to identify the item of mail and is therefore referred to as an "identification feature value vector". The second sorting system Anl-2 does not use an OCR unit to automatically decide on the onward transport of the item of mail during the further decision-making process.

Figure 3:
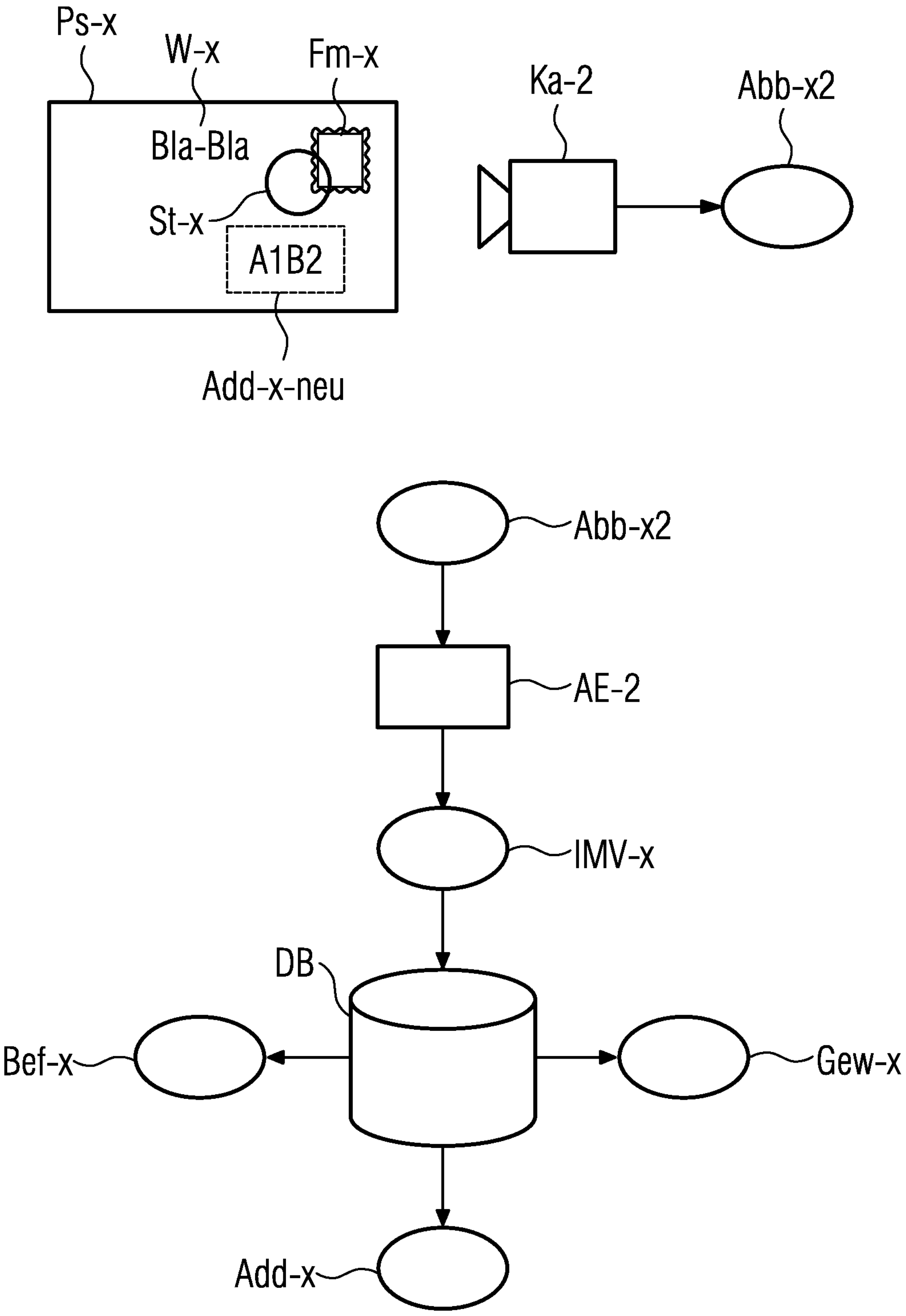
FIG. 3 is an illustration showing the run of an item of mail through the second sorting system.

FIG. 3 illustrates the run of the item of mail Ps-x through the second sorting system Anl-2. A camera Ka-2 of the second sorting system Anl-2 generates a further computer-accessible image Abb-x2 of the surface of the item of mail Ps-x. An evaluation unit AE-2 of the second sorting system Anl-2 evaluates this image Abb-x2 and generates an identification feature value vector IMV-x for the item of mail Ps-x. The identification feature value vector IMV-x is compared with registration feature value vectors which are stored in the central database DB.

Since many millions of items of mail are transported daily in Germany alone, it would take much too long to compare the identification feature value vector IMV-x for the item of mail Ps-x with all registration feature value vectors stored in the central database DB. Therefore, a method for restricting the search space among the data records in the central database DB is preferably used. Such methods are known, for example, from European patent EP 1222037 B1, published, non-prosecuted German patent application DE 10 2008 017191 A1 and published, non-prosecuted German patent application DE 10 2008 017190 A1. Restricting the search space considerably reduces the quantity of stored registration feature value vectors with which an identification feature value vector IMV-x is compared.

When comparing the identification feature value vector IMV-x and a stored registration feature value vector RMV-y, a degree of match between these two feature value vectors IMV-x and RMV-y is preferably calculated. That stored registration feature value vector which has the greatest degree of match with the identification feature value vector IMV-x of the item of mail Ps-x is used as the registration feature value vector RMV-x of this item of mail Ps-x.

That data record to which the found registration feature value vector RMV-x with the greatest degree of match belongs is determined. This data record contains the destination indication of the item of mail Ps-x and, in one refinement, further transport attribute values which were measured during the first run. These transport attribute values are used to carry out the further decision-making process regarding how the item of mail Ps-x should be transported onward.

Each sorting system has a plurality of sorting outlets, for example sorting compartments. FIG. 1 illustrates sorting outlets Aus-1.1, Aus-1.2, . . . , Aus 2.1, Aus 2.2, . . . of the two sorting systems Anl-1, Anl-2. Each sorting system Anl-1, Anl-2 respectively evaluates a computer-accessible sorting plan which respectively assigns a sorting outlet of the sorting system used to each possible destination indication or to each destination indication which actually occurs. According to this sorting plan, the sorting system discharges each item of mail into that sorting outlet which is assigned to the destination indication on the item of mail. During the second run and during each further run, the sorting system uses the destination indication from the determined data record to select a sorting outlet.

In the exemplary embodiment, some or even all of the items of mail are provided with at least one optically detectable element after a computer-accessible image of the item of mail has been generated for the first time. Examples of such optically detectable elements are now described.

A franking mark on the item of mail is canceled. Examples of a franking mark are a stamp, a franking emblem or a matrix code with a code for a payment process. This cancellation is carried out after the franking mark has been evaluated, for which purpose the first image of the item of mail Ps-x was evaluated. This first image shows the franking mark which has not yet been canceled. In one refinement, cancellation depends on whether or not the item of mail has been provided with an adequate franking mark. In addition, the stamp imprint could make it difficult to evaluate the image. Whether the actual fee which has actually been paid and was determined by evaluating the franking mark suffices to transport the item of mail depends on a plurality of transport attribute values, for example the destination indication (national or international items of mail), the measured weight and/or dimensions of the item of mail.

In one refinement, a copy of a previously unaddressed bulk mailing is provided with a destination indication after the first measurement. This destination indication is taken from a computer-accessible list which contains destination indications and was transmitted to the carrier by the sender.

After the destination indication has been deciphered, this destination indication is compared with entries in a forwarding file or a forwarding data memory. Entries relating to address changes of recipients of items of mail, for example on account of forwarding requests from recipients because a recipient has rented a P.O. box or parcel compartment or because a company has been renamed, has moved or has been liquidated, are entered in this forwarding file. If an item of mail is to be forwarded or is to be returned to the sender, the previous destination indication is replaced with a new indication, for example an indication of the new address of the recipient or the sender address. Either the new address is directly printed onto the item of mail or a label containing the new address is printed onto the item of mail. The use of a label is required, in particular, when the item of mail has been packaged in a transparent film and this film can be bonded but not printed. Examples of such methods are known from U.S. Pat. No. 5,703,783 and European patent EP 1656217 B1.

In the example in FIG. 2, the item of mail Ps-x is provided, by way of example, with the following three optically detectable elements:

the stamp St-x on the franking mark Fm-x, the advertising imprint W-x, and the indication of the new destination address Add-x-new.

This at least one optically detectable element is automatically applied by a printer Dr during the first run of the item of mail Ps-x through a sorting system and after the camera Ka-1 has generated an image of the item of mail Ps-x. The following are predefined to the printer Dr for this purpose:

a computer-accessible pattern of the imprint, for example a pixel file containing a logo or a sequence of alphanumeric characters, associated with color and formatting information, and a stipulation of that position at which this imprint or this label should be applied to the item of mail.

In accordance with the computer-accessible pattern Mu-x, each optically detectable element is printed onto the item of mail Ps-x by a printer Dr or a labeler Lab at that location which is defined by the position stipulation Pos-x. A light barrier preferably detects when a front edge or front surface of the item of mail Ps-x has reached a particular position during the run through the sorting system. The transport speed at which the item of mail is transported is also measured. The control unit SE controls the printer Dr or the labeler Lab on the basis of signals from the light barrier and the transport speed and transmits the pattern Mu-x and the position stipulation Pos-x to the printer Dr. The printer Dr is preferably in the form of a wide-area printer, with the result that the printer Dr can print elements onto a surface of the upright item of mail at different heights.

During each new run through a sorting system, the item of mail has the optically detectable element. Each further computer-accessible image of the item of mail therefore shows the optically detectable element. The effect of the optically detectable element on the feature value vectors of the item of mail is therefore taken into account. There are a plurality of possible refinements for this.

In one refinement, a supplemented computer-accessible image is calculated from the first image of the item of mail Ps-x. An image of the optically detectable element is computationally fitted into the first image. The computer-accessible pattern and the position stipulation are used for this fitting-in process. If necessary, an imaging scale is also taken into account. This imaging scale belongs to the printing original and takes into account the possibility of the predetermined pattern being a factor smaller or else larger than the actual imprint.

For example, both the first image Abb-x1 of the item of mail Ps-x and the computer-accessible pattern Mu-x for the optically detectable element are each composed of a large number of pixels. A respective code for a color value is assigned to each pixel. During the "fitting-in process", the color value of a pixel in the first image Abb-x1 and the color value of the corresponding pixel in the pattern Mu-x are used to calculate a resultant color value which is used as the color value of the pixel in the supplemented image Abb-x1-erg. The pattern is thus calculated into the first image pixel by pixel.

The registration feature value vector RMV-x is calculated by evaluating the image supplemented in this manner and determining, for each optically detectable feature, the value assumed by the supplemented image for this feature. The n feature values are calculated in the same manner as for the further image.

Figure 4:
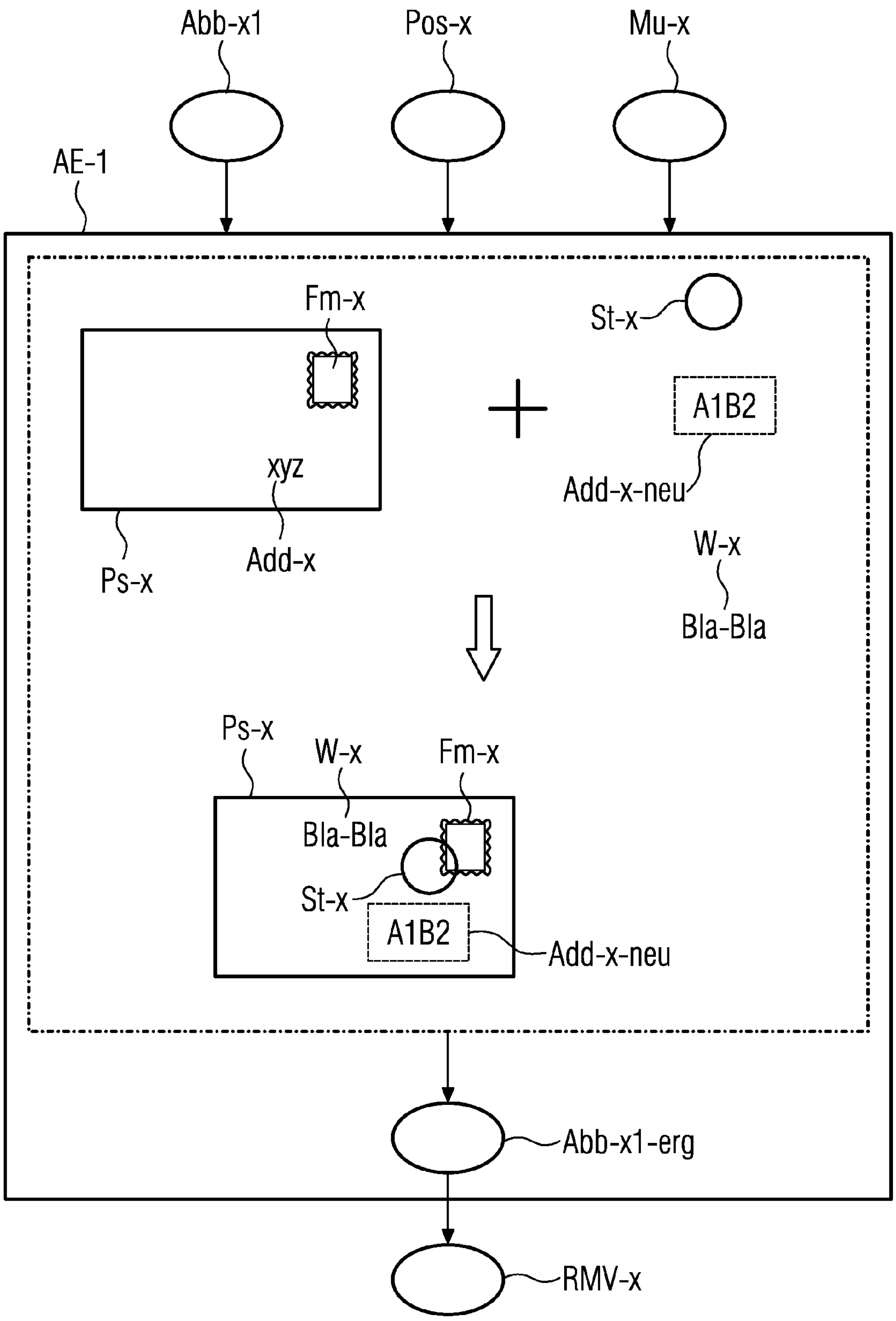
FIG. 4 is an illustration showing the calculation of a supplemented image from an image without an optically detectable element.

FIG. 4 illustrates the calculation of the supplemented computer-accessible image Abb-x1-erg by the evaluation unit AE-1 of the first sorting system Anl-1. For this calculation, the evaluation unit AE-1 uses the first image Abb-x1 of the item of mail Ps-x, which image was provided by the camera Ka-1, the computer-accessible position information Pos-x for the stamp imprint St-x and the advertising imprint W-x, and the computer-accessible patterns Mu-x for the stamp imprint St-x and the advertising imprint W-x from the pattern database Mu-DB.

The first evaluation unit AE-1 generates the registration feature value vector RMV-x by evaluating the supplemented image Abb-x1-erg rather than the first image Abb-x1.

In another refinement, an initial feature value vector is generated from the first image of the item of mail Ps-x. Since the first image Abb-x1 does not show the optically detectable element, the initial feature value vector does not take into account the effect of this optically detectable element. A supplemented feature value vector is then calculated from the initial feature value vector and is used as the registration feature value vector RMV-x. This supplemented feature value vector contains, for each feature, that value which will be assumed by the feature for the item of mail Ps-x after each optically detectable element Pos-x has been applied. The position stipulation Pos-x and the element pattern Mu-x are used to calculate this supplemented feature value vector.

The manner in which a feature value of the supplemented feature value vector is calculated depends on the feature. Some features are not influenced by the application of the optically detectable element, with the result that the value remains identical. This applies, in particular, when the feature relates solely to a first region of the item of mail, the optically detectable element is printed on a second region and these two regions do not overlap. For many other features, the value of the feature for the item of mail containing the optically detectable element is equal to the sum of the feature value without the optically detectable element plus a value assumed by the feature if the optically detectable element were applied at the same location onto a neutral item of mail, for example a completely white item of mail. This neutral item of mail acts as a reference article. This additivity of the two feature values applies, in particular, when the feature is a color value or gray-scale value distribution.

In a third refinement, that region of the surface of the item of mail in which the optically detectable element lies is masked from the registration and identification of the item of mail ("blind spot"). For this purpose, a stipulation of a region of the surface which completely encompasses the optically detectable element is predefined or determined, with the result that the optically detectable element lies completely in the predefined region. This region is a rectangle or an ellipse, for example. The region stipulation is derived from the position stipulation and the element pattern, for example. The region stipulation stipulates the position and dimensions and preferably a color, for example white.

Figure 5B:
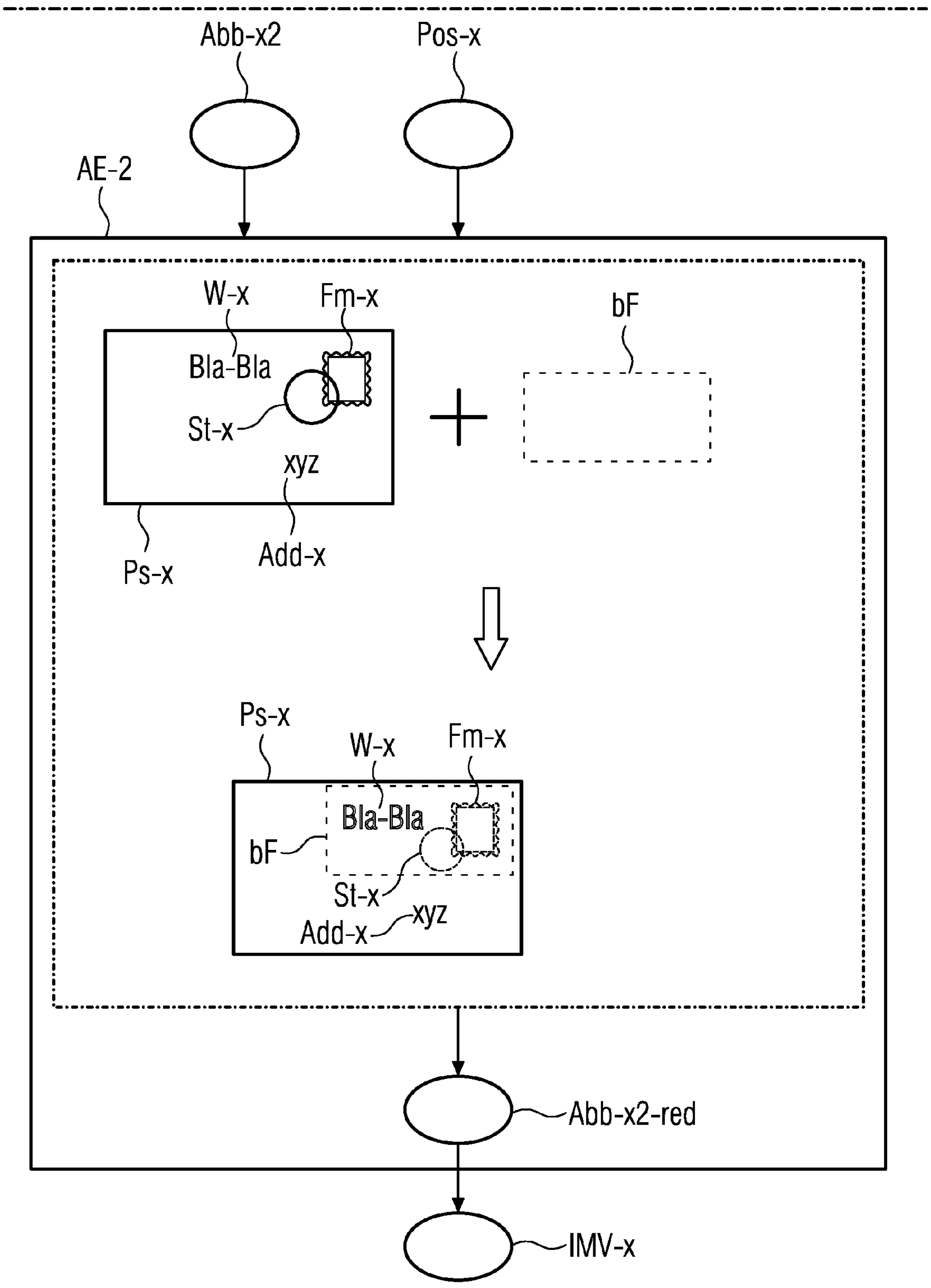

FIG. 5 illustrates how two reduced images are calculated using a "blind spot" bF. The first evaluation unit AE-1 calculates a first reduced image Abb-x1-red from the first image Abb-x1 of the item of mail Ps-x generated by the first camera Ka-1 and calculates the registration feature value vector RMV-x for the item of mail Ps-x from this first reduced image Abb-x1-red. The second evaluation unit AE-2 calculates a second reduced image Abb-x2-red from the second image Abb-x2 of the item of mail Ps-x generated by the second camera Ka-2 and calculates the identification feature value vector IMV-x for the item of mail Ps-x from this second reduced image Abb-x2-red. In one refinement, the contour of the item of mail Ps-x—as seen from that direction from which the images of the item of mail Ps-x are produced—is mirror-symmetrical about at least one axis, for example is a rectangular contour. The covering region is preferably likewise symmetrical about this axis of symmetry. For example, the region consists of four rectangles which are symmetrically arranged in the four corners of a rectangular item of mail.

In one refinement, this region is computationally fitted into each image Abb-x1, Abb-x2 of the item of mail Ps-x, to be precise in such a manner that the region is calculated into the image at the predefined position. This region completely covers the image of the optical element. Each feature value vector is calculated from the image in which the region covers the image of the optically detectable element. The optically detectable element is thus computationally removed from the images.

In another refinement, an initial feature value vector is first of all calculated from the respective image of the item of mail Ps-x, as described above. The first image of the item of mail shows the surface of the item of mail without the optically detectable element, and each further image additionally shows this optically detectable element. The initial feature value vector is computationally changed. For this purpose, a calculation is carried out for each optically detectable feature in order to determine the value assumed by this feature for the item of mail if the surface of the item of mail were to have the region instead of the optically detectable element. The changed feature value vector is used as the registration feature value vector or as the identification feature value vector.

The invention claimed is:

1. A method for transporting an article to a destination, the article having at least one predefined optically detectable feature and at least one predefinable transport attribute, which comprises the steps of:

performing a transporting operation having a first decision-making process and at least one second, subsequent decision-making process concerning a respective continuation of the transporting operation, the first decision-making process comprises the following steps being carried out automatically:

generating at least one first computer-accessible image of the article;

carrying out, for each predefined optically detectable feature, a first measurement to determine a value assumed by the predefined optically detectable feature of the article, for which purpose the at least one first computer-accessible image is evaluated and resulting in measured feature values;

carrying out, for each predefined transport attribute, a measurement to determine a value assumed by the predefined transport attribute for the article resulting in at least one measured transport attribute value;

generating a data record for the article and storing the data record in a data memory, the data record containing a first feature value vector having the measured feature values and the at least one measured transport attribute value;

carrying out the first decision-making process on a basis of the at least one measured transport attribute value; and transporting the article onward on a basis of a result of the first decision-making process;

performing the second decision-making process which comprises the following steps being carried out automatically:

generating a second computer-accessible image of the article;

carrying out, for the predefined optically detectable feature, a renewed measurement to determine a value assumed by the predefined optically detectable feature for the article, for which purpose the second computer-accessible article image is evaluated;

generating a further data record for the article and storing the further data record the data memory, for which purpose a second feature value vector measured during the renewed measurement is used to search for the further data record in the data memory;

determining at least one further transport attribute value included in the further data record determined;

carrying out the second decision-making process on a basis of the at least one further transport attribute value determined;

transporting the article onward on a basis of a result of the second decision-making process;

providing a surface of the article with at least one optically detectable element after the first measurement and before the renewed measurement, a predefined computer-accessible stipulation of a position of the optically detectable element on the surface of the article and a predefined computer-accessible element pattern of the optically detectable element being used for providing the surface with the optically detectable element; and generating the first feature value vector during the first decision-making process and stored as part of the data record in such a manner that the first feature value vector contains, for each predefined optically detectable feature, that value which would have been assumed by the predefined optically detectable feature for the article if the surface of the article had already been provided with the optically detectable element during the first measurement, the stipulation of the position and the element pattern are used for the step of generating the first feature value vector, and the at least one second computer-accessible article image which is evaluated for the renewed measurement is generated from the article provided with the optically detectable element.

2. The method according to claim 1, wherein the step of generating the first feature value vector to be stored in the data memory, further comprises the following steps of:

generating the first computer-accessible image from the article without the optically detectable element;

calculating a supplemented image of the article, the supplemented image showing how the article will look after the surface of the article has been provided with the optically detectable element, for which purpose the first computer-accessible image is used; and generating the first feature value vector by evaluating the supplemented image.

3. The method according to claim 2, which further comprises using the stipulation of the position and/or the element pattern for at least one of the two steps:

generating the supplemented image; or generating the first feature value vector by evaluating the supplemented image.

4. The method according to claim 1, wherein the step of generating the first feature value vector to be stored in the data memory further comprises the following steps:

generating the first computer-accessible image from the article without the optically detectable element;

generating an initial feature value vector by evaluating the first image; and calculating a supplemented feature value vector in such a manner that the supplemented feature value vector contains, for the predefined optically detectable feature, that value which will be assumed by the predefined optically detectable feature for the article after the surface of the article has been provided with the optically detectable element, wherein the supplemented feature value vector is calculated using the initial feature value vector.

5. The method according to claim 4, which further comprises using the initial feature value vector, the stipulation of the position and the element pattern for the step of calculating the supplemented feature value vector.

6. The method according to claim 4, wherein for at least one predefined optically detectable feature, the value for the article with the optically detectable element is calculated as a sum of the value for the article without the optically detectable element and a value assumed by a reference article when the reference article is provided with the optically detectable element using the stipulation of the position and the element pattern.

7. The method according to claim 1, which further comprises:

predefining a computer-accessible stipulation of an elimination region of the surface of the article and the optically detectable element lies completely in the elimination region;

generating the first feature value vector to be stored in the data record in such a manner that the first feature value vector contains, for the predefined optically detectable feature, that value which would have been assumed by the predefined optically detectable feature if the elimination region had been removed from the surface;

changing the second feature value vector obtained during the renewed measurement in such a manner that a changed second feature value vector contains, for each predefined optically detectable feature, the value which would have been assumed by the predefined optically detectable feature if the elimination region had been removed from the surface; and using the changed second feature value vector when determining the data record.

8. The method according to claim 7, which further comprises:

generating both the at least one first computer-accessible image and the second computer-accessible image of the article in such a manner that both the first and second computer-accessible images show the respective surface together with the elimination region;

generating a first elimination image which shows the surface without the elimination region from the first computer-accessible image;

generating the first feature value vector to be stored by evaluating the first elimination image;

generating a further elimination image which shows the surface without the elimination region from the second computer-accessible image; and generating the second feature value vector measured during the renewed measurement by evaluating the further elimination image.

9. A configuration for transporting an article to a destination, the article having at least one predefined optically detectable feature and at least one predefined transport attribute, the configuration comprising:

an attribute measuring device;

a first transport apparatus having a first data processing system, a first image recording device and a first feature measuring device, said first feature measuring device is connected to said first image recording device;

a second transport apparatus having a second data processing system, a second image recording device and a second feature measuring device, said second feature measuring device is connected to said second image recording device;

a change device;

a data memory;

said first and second image recording devices configured to respectively record at least one computer-accessible article image of a surface of the article;

said first and second feature measuring devices configured to measure a value respectively assumed by each predefined optically detectable feature for the article by respectively evaluating the at least one computer-accessible article image;

said first transport apparatus configured to automatically carry out a first decision-making process, the first decision-making process programmed to:

generate via said first image recording device a first computer-accessible image of the article;

measure via said first feature measuring device, for each predefined optically detectable feature, a value assumed by the predefined optically detectable feature for the article resulting in measured feature values;

measure via said attribute measuring device, for each predefined transport attribute, a value assumed by the predefined transport attribute for the article resulting in at least one measured attribute value;

generate via said first data processing system a data record for the article and store the data record in said data memory, the data record containing a first feature value vector with the measured feature values and the at least one measured transport attribute value; and said first transport apparatus carrying out the first decision-making process on a basis of the at least one measured transport attribute value;

the configuration configured to continue a transport of the article on a basis of a result of the first decision-making process;

said second transport apparatus configured to automatically carry out a second decision-making process, the second decision-making process programmed to:

generate via said second image recording device a second computer-accessible image of the article;

measure via said second feature measuring device, for each predefined optically detectable feature, the value assumed by the predefined optically detectable feature for the article;

determine via said second data processing system a second data record generated for the article and stored in the data memory, for which purpose said second data processing system using a second feature value vector from said second feature measuring device to search for the second data record in said data memory;

determining via said second data processing system at least one transport attribute value included in the second data record;

said second transport apparatus carrying out the second decision-making process on a basis of the at least one transport attribute value determined;

the configuration configured to continue the transport of the article on a basis of the result of the second decision-making process;

said change device disposed in such a manner that the article is first of all transported past said first image recording device, then past said change device and then past said second image recording device, and said change device configured to provide a surface of the article with an optically detectable element;

an element data memory storing a computer-accessible stipulation of a position of an optically detectable element on the surface of the article and a computer-accessible element pattern of the optically detectable element;

said change device configured to use the position and the element pattern from said element data memory during the step of providing the surface of the article with the optically detectable element;

said first data processing system configured to generate the first feature value vector stored in the data record during the first decision-making process in such a manner that the first feature value vector contains, for each predefined optically detectable feature, that value which would have been assumed by the predefined optically detectable feature for the article if the surface of the article had already been provided with the optically detectable element during the first measurement, for which purpose said first data processing system uses the position and the element pattern for the step of generating the first feature value vector; and said second image recording device generating the second computer-accessible image, which is evaluated for the renewed measurement, from the article which has been provided with the optically detectable element.

10. The configuration according to claim 9, wherein during the step of generating the first feature value vector to be stored in said data memory, said first data processing system is configured to:

generate the first computer-accessible image from the article without the optically detectable element;

calculate a supplemented image of the article, the supplemented image showing how the article will look after the surface of the article has been provided with the optically detectable element, for which purpose said first data processing system uses the first computer-accessible image; and generate the first feature value vector by evaluating the supplemented image.

11. The configuration according to claim 9, wherein during the step of generating the first feature value vector to be stored in the data memory, said first data processing system is configured to:

generate the first computer-accessible image from the article without the optically detectable element;

generate an initial feature value vector by evaluating the first computer-accessible image; and calculate a supplemented feature value vector such that the supplemented feature value vector contains, for each predefined optically detectable feature, that value which will be assumed by the predefined optically detectable feature for the article after the surface of the article has been provided with the optically detectable element, said first data processing system calculating the supplemented feature value vector using the initial feature value vector.

* * * * *